United States Patent
Yuan et al.

(10) Patent No.: US 11,456,660 B2
(45) Date of Patent: Sep. 27, 2022

(54) GROUNDING SCHEME FOR POWER CONVERSION SYSTEM

(71) Applicant: General Electric Company, Schenectady, NY (US)

(72) Inventors: Zhihui Yuan, Garching b. Munich (DE); Stefan Schroeder, Garching b. Munich (DE); Jie Shen, Shanghai (CN); Mohamed Ahmed Abdelmohsen Hashem, Garching b. Munich (DE); Yunzheng Chen, Garching b. Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 344 days.

(21) Appl. No.: 15/777,919

(22) PCT Filed: Dec. 19, 2016

(86) PCT No.: PCT/US2016/067620
§ 371 (c)(1),
(2) Date: May 22, 2018

(87) PCT Pub. No.: WO2017/112606
PCT Pub. Date: Jun. 29, 2017

(65) Prior Publication Data
US 2018/0342943 A1    Nov. 29, 2018

(30) Foreign Application Priority Data

Dec. 25, 2015   (CN) .......................... 201510996105.1

(51) Int. Cl.
*H02M 1/12* (2006.01)
*H02M 1/32* (2007.01)
(Continued)

(52) U.S. Cl.
CPC ............. *H02M 1/126* (2013.01); *H02M 1/32* (2013.01); *H02M 5/42* (2013.01); *H02M 5/45* (2013.01);
(Continued)

(58) Field of Classification Search
CPC ...................................................... H02M 1/126
See application file for complete search history.

(56) References Cited

U.S. PATENT DOCUMENTS 5,666,255 A     9/1997   Muelleman
5,805,032 A *   9/1998   Herbst ................. H03H 1/0007
                                                363/47
(Continued)

FOREIGN PATENT DOCUMENTS

CN         1695290 A    11/2005
CN       102647149 A     8/2012
(Continued)

OTHER PUBLICATIONS

International Search Report and Written Opinion issued in connection with corresponding PCT Application No. PCT/US2016/067620 dated May 4, 2017.
(Continued)

*Primary Examiner* — Daniel Kessie
(74) *Attorney, Agent, or Firm* — Wood IP LLC

(57) ABSTRACT

A power conversion system includes one or more power conversion devices coupled to a grid connection. Each of the power conversion devices includes a power converter for converting a first multiphase current provided by the grid connection into a second current; a grid side filter coupled between the grid connection and an input of the power converter; a load side filter coupled to an output of the power converter; neutral points of the grid side filter and the load (Continued)

side filter connected together to form a first node; wherein the first node is not directly grounded.

10 Claims, 8 Drawing Sheets

(51) Int. Cl.
*H02M 5/45* (2006.01)
*H02M 5/42* (2006.01)
*H02P 9/14* (2006.01)
*H02P 27/06* (2006.01)

(52) U.S. Cl.
CPC .............. *H02M 1/123* (2021.05); *H02P 9/14* (2013.01); *H02P 27/06* (2013.01)

(56) References Cited

U.S. PATENT DOCUMENTS

| | | | |
|---|---|---|---|
| 6,617,814 B1 | 9/2003 | Wu et al. | |
| 6,750,633 B2* | 6/2004 | Schreiber | H02J 3/38 318/811 |
| 7,751,993 B2 | 7/2010 | Mirafzal | |
| 8,223,511 B2 | 7/2012 | Cheng et al. | |
| 8,841,917 B2 | 9/2014 | Wei et al. | |
| 9,091,742 B2 | 7/2015 | Wei et al. | |
| 9,490,738 B2* | 11/2016 | Nondahl | H02M 1/126 |
| 2007/0211501 A1* | 9/2007 | Zargari | H02M 1/44 363/39 |
| 2010/0080028 A1* | 4/2010 | Cheng | H02M 5/4585 363/126 |
| 2012/0106210 A1 | 5/2012 | Xu et al. | |
| 2012/0194202 A1* | 8/2012 | Xiao | H02M 5/458 324/548 |
| 2012/0271572 A1 | 10/2012 | Xiao et al. | |
| 2014/0139167 A1 | 5/2014 | Steimer | |
| 2014/0211520 A1* | 7/2014 | Zhang | H02M 1/126 363/37 |
| 2014/0268933 A1* | 9/2014 | Zhou | H02M 1/12 363/44 |
| 2016/0248334 A1* | 8/2016 | Patel | H03H 7/1741 |

FOREIGN PATENT DOCUMENTS

| | | |
|---|---|---|
| CN | 102714469 A | 10/2012 |
| EP | 2 525 482 A1 | 11/2012 |
| WO | 2013/017353 A1 | 2/2013 |

OTHER PUBLICATIONS

International preliminary Report on Patentability issued in connection with corresponding PCT Application No. PCT/US2016/067620 dated Jun. 26, 2018.

Machine Translation and First Office Action and search issued in connection with corresponding CN Application No. 201510996105.1 dated Aug. 15, 2018.

Rodriguez Valdez C D et al., "Method to detect line-to-ground faults in high-resistance-ground networks", Energy Conversion Congress and Exposition (ECCE), 2010 IEEE, pp. 2284-2292, Sep. 12-16, 2010, Atlanta, GA.

Steimer P K et al., "Transformerless multi-level converter based medium voltage drives", Energy Conversion Congress and Exposition (ECCE), 2011 IEEE, pp. 3435-3441, Sep. 17-22, 2011, Phoenix, AZ.

Bin Wu et al., "An integrated DC link choke for elimination of motor common-mode voltage in medium voltage drives", Industry Applications Conference, 2001. Thirty-Sixth IAS Annual Meeting. Conference Record of the 2001 IEEE, vol. 3, pp. 2022-2027, Sep. 30, 2001-Oct. 4, 2001, Chicago, IL, USA.

* cited by examiner

GROUNDING SCHEME FOR POWER CONVERSION SYSTEM

BACKGROUND

The field of the disclosure relates generally to power electronics circuits and, more particularly, to power conversion systems.

Known power conversion systems, such as variable frequency drive (VFD), with a power converter can be used for converting a first current from a power grid into a second current which can be supplied to a further grid or an electrical motor, or can be supplied from a generator into the power grid.

Many of the power conversion systems can be designed to include an isolation transformer, which often has a very low efficiency due to size specifications. In transformerless power conversion systems, the available common mode impedance characteristic of the isolation transformer can be replaced by common mode impedances.

Additionally, there is a need to provide ground fault protection for the transformerless power conversion system as there is no isolation transformer.

BRIEF DESCRIPTION

In accordance with one or more exemplary embodiments disclosed herein, a power conversion system includes one or more power conversion devices coupled to a grid connection. Each of the power conversion devices includes a power converter for converting a first multiphase current provided by the grid connection into a second current; a grid side filter coupled between the grid connection and an input of the power converter; a load side filter coupled to an output of the power converter; neutral points of the grid side filter and the load side filter are connected together to form a first node, wherein the first node is not directly grounded.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Figure 1:
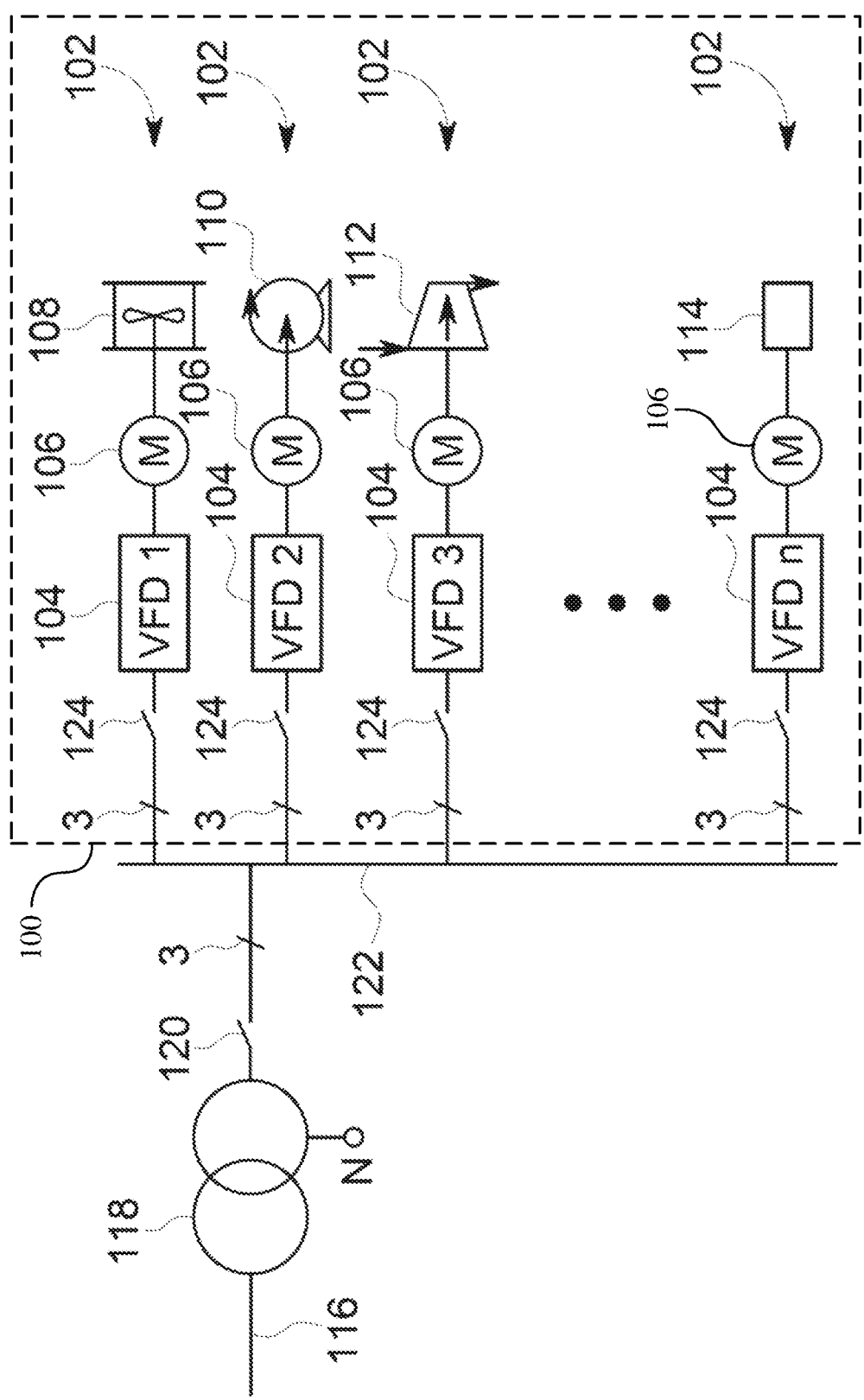
FIG. 1 is a schematic block diagram of a power conversion system in accordance with an exemplary embodiment of the present invention.

FIG. 1 is a schematic block diagram of a power conversion system 100 in accordance with an exemplary embodiment of the present invention. The power conversion system 100 includes a plurality n of power conversion devices 102 coupled to a grid connection 122. Each of the power conversion devices 102 includes a power converter 104 that may be configured as a variable frequency drive (VFD), for example. The power converter 104 is configured to drive a load 106, for example an electrical motor, which is coupled to a rotatable device, such as, but, not limited to a fan 108, a pump 110, a compressor 112, or other load 114.

In the exemplary embodiment, the power conversion system 100 may be transformerless power conversion system, for example. That is, an input of the power converter 104 is coupled to the grid connection 122 without transformer, and an output of the power converter 104 is coupled to the load 106 without transformer.

In the exemplary embodiment, the power conversion system 100 is supplied with an electrical power from a grid 116 through a step-down transformer 118 configured to step down the supply voltage from a transmission voltage level to a distribution voltage level. A circuit breaker 120 permits isolating the power conversion system 100 from the grid 116. Each of the power conversion devices 102 is supplied through, for example, the grid connection 122. The circuit breaker 124 in each of the power conversion devices 102 permits isolating a respective power conversion device 102 from the grid connection 122 for normal startup and shutdown of the power conversion devices 102.

Figure 2:
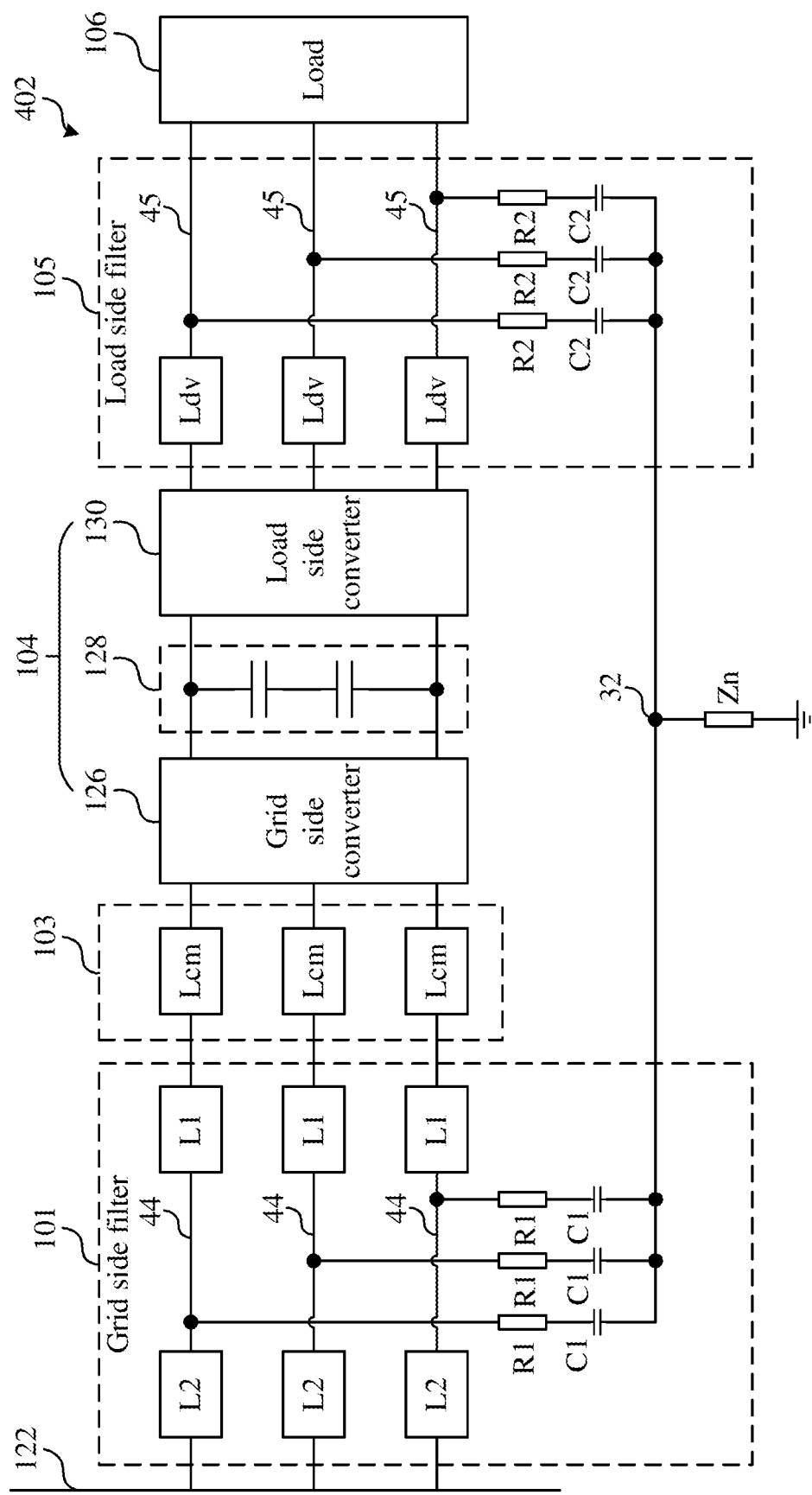
FIG. 2 is a schematic block diagram of the power conversion device in accordance with a first embodiment of the present invention.

FIG. 2 is a schematic block diagram of the power conversion device 402, an example of the power conversion device 102 in FIG. 1, in accordance with a first embodiment of the present invention. The power conversion device 602 includes a grid side filter 101, a load side filter 105, and a power converter 104.

The power converter 104 may be configured to convert a first multiphase current in the phases 44 into a second current. The second current is supplied to the load 106 through the load side filter 105. The first multiphase current may have three phase currents. Further, phases 44 may include three phases.

In one exemplary embodiment, the power converter 104 may include a voltage source converter, for example.

In one exemplary embodiment, the power converter 104 may include a multilevel converter, for example.

In the exemplary embodiment, the power converter 104 may be configured as a variable frequency drive (VFD), for example. The power converter 104 includes a grid side converter 126, a load side converter 130, and a DC link 128 coupled between the grid side converter 126 and the load side converter 130. An input of the grid side converter 126 is coupled to the grid connection 122 through the grid side filter 101. An output of the load side converter 130 is coupled to the load 106 through the load side filter 105.

In the embodiment of FIG. 2, neutral points or common points, as described below, of the grid side filter 101 and the load side filter 105 are connected together to form a first node 32. The first node 32 is not directly grounded.

The grid side filter 101, for each phase 44 of an input of the power converter 104, includes a first inductor L1, a second inductor L2, a first resistor R1, a first capacitor C1. One end of the first inductor L1 is coupled to the respective phase 44 of the input of the power converter 104, the other end of the first inductor L1 is coupled to a respective phase of the grid connection 122 through the second inductor L2. Further, the first resistor R1 and the first capacitor C1 are connected in series. One end of a series connection of the first resistor R1 and the first capacitor C1 is connected between the first inductor L1 and the second inductor L2, the other end of the series connection of the first resistor R1 and the first capacitor C1 is connected to the first node 32. A connection point of the other end of the series connection of the first resistor R1 and the first capacitor C1 and the first node 32 is a neutral point or a common point of the grid side filter 101.

The grid side filter 101 is configured to substantially reduce distortions within the AC signal input of the power converter 104. In one exemplary embodiment, the grid side filter 101 may include a sine filter for example. The sine filter may substantially reduce current and voltage harmonics, and limit overvoltages.

The load side filter 105, for each phase 45 of an output of the power converter 104, includes a third inductor Ldv, a second resistor R2, a second capacitor C2. The third inductor Ldv is coupled between the respective phase 45 of the output of the power converter 104 and a respective phase of the input of the load 106. Further, the second resistor R2 and the second capacitor C2 are connected in series. One end of a series connection of the second resistor R2 and the second capacitor C2 is coupled between the third inductor Ldv and the respective phase of the input of the load 106, the other end of the series connection of the second resistor R2 and the second capacitor C2 is coupled to the first node 32. A connection point of the other end of the series connection of the second resistor R2 and the second capacitor C2 and the first node 32 is a neutral point or a common point of the load side filter 105.

The load side filter 105 is configured to substantially reduce distortions within the AC signal output from the power converter 104. In one exemplary embodiment, the load side filter 105 may include a dv/dt filter for example, the dv/dt filter may substantially reduce the rate of voltage change over time (dV/dt), and limit overvoltages.

The power conversion device 102 further includes a common mode filter 103. In the exemplary embodiment, the common mode filter 103 is coupled between the grid side filter 101 and the power converter 104. In other exemplary embodiments, the common mode filter 103 is coupled between the power converter 104 and the load side filter 105. In the exemplary embodiment, the common mode filter 103 may include a common mode choke for example.

The power conversion device 102 further includes an impedance Zn coupled between the first node 32 and the ground. In the exemplary embodiment, the impedance Zn may include an inductance, a capacitance, a resistance, or a combination of multiple such elements coupled in series or in parallel, for example. In other embodiments, the first node 32 is directly grounded, that is the first node 32 is not connected to the ground via an impedance.

In the exemplary embodiment, the impedance Zn may be high impedance, for example.

In the exemplary embodiment, the load 106 may include an electrical motor for receiving the second current, for example. In other exemplary embodiments, the load 106 may include a transformer for transforming the second current, for example.

Figure 3:
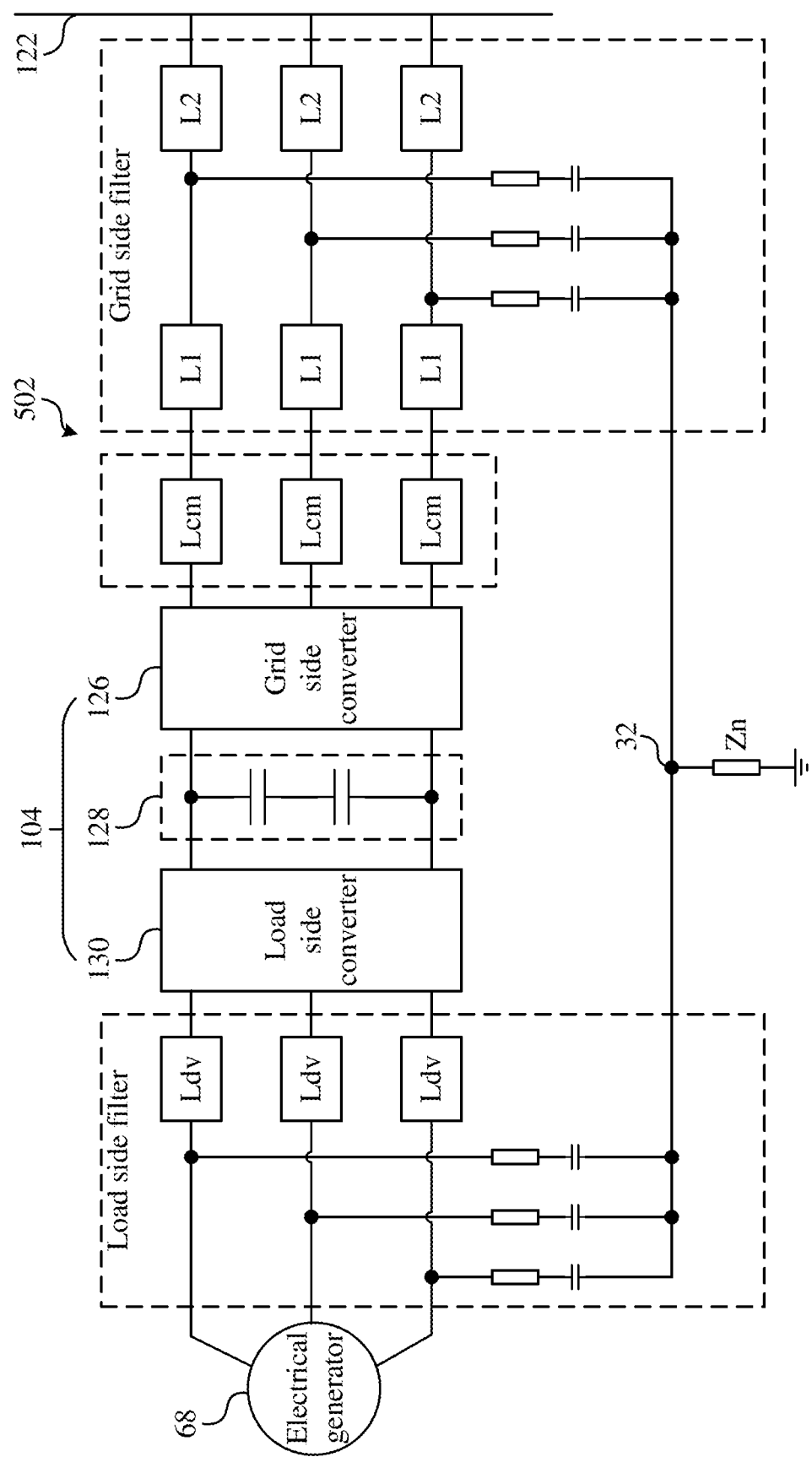
FIG. 3 is a schematic block diagram of the power conversion device in accordance with a second embodiment of the present invention.

FIG. 3 is a schematic block diagram of the power conversion device 502, an example of the power conversion device 102 in FIG. 1, in accordance with a second embodiment of the present invention. The difference between the power conversion device 502 of FIG. 3 and the power conversion device 402 of FIG. 2 is that the power conversion device 502 can include an electrical generator 68 configured to generate the second current, as described in FIG. 2. For example, the electrical generator 68 can be connected to a turbine of water or tidal power station or to a wind turbine.

Figure 4:
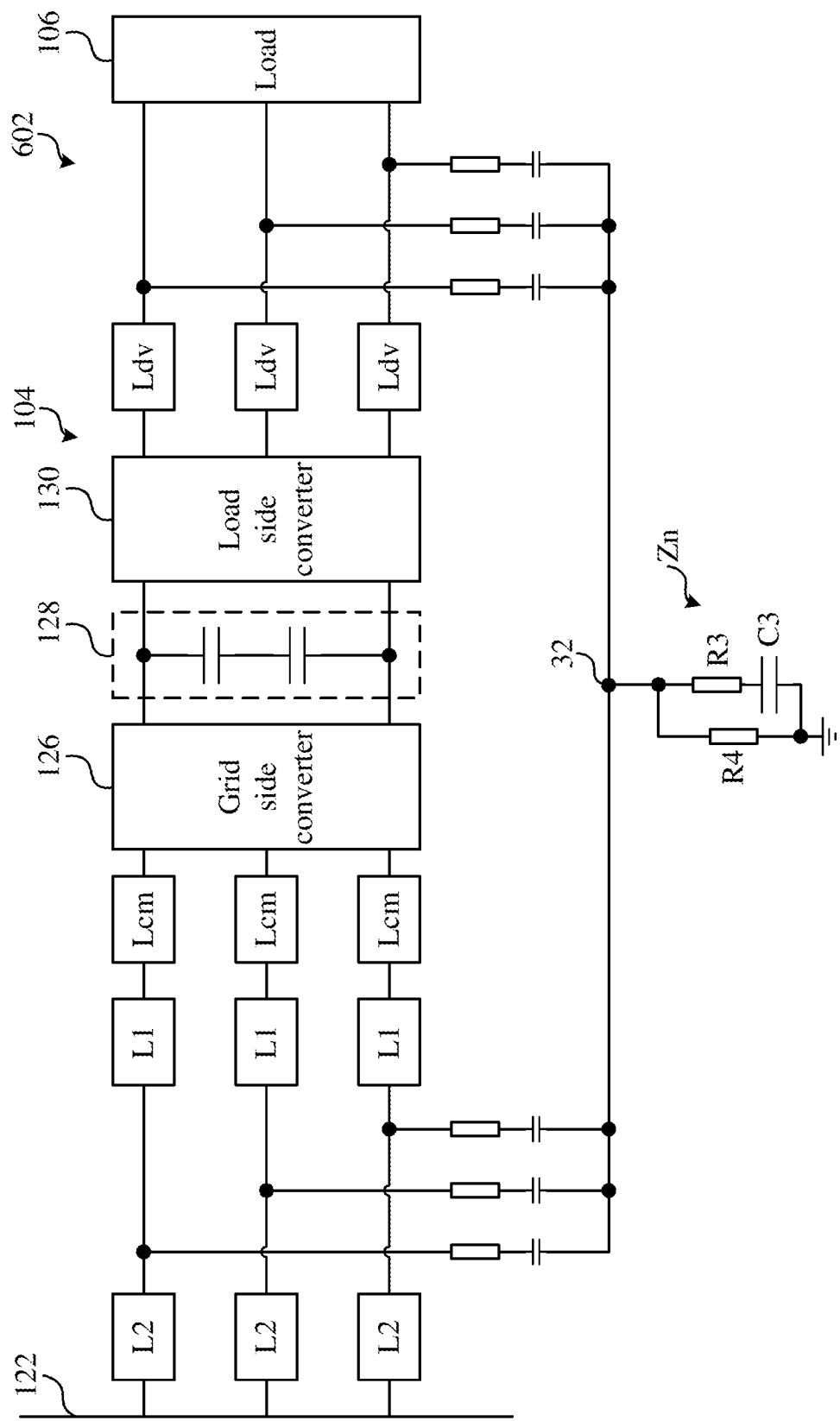
FIG. 4 is a schematic block diagram of the power conversion device in accordance with a third embodiment of the present invention.

FIG. 4 is a schematic block diagram of the power conversion device 602, an example of the power conversion device 102 in FIG. 1, in accordance with a third embodiment of the present invention. In the embodiment of FIG. 4, the impedance Zn includes a first resistance R3, a second resistance R4, and a capacitance C3; the first resistance R3 and the capacitance C3 are connected in series; the second resistance R4 and a series connection of the first resistance R3 and the capacitance C3 are coupled in parallel between (i.e., connected across) the first node 32 and the ground.

Figure 5:
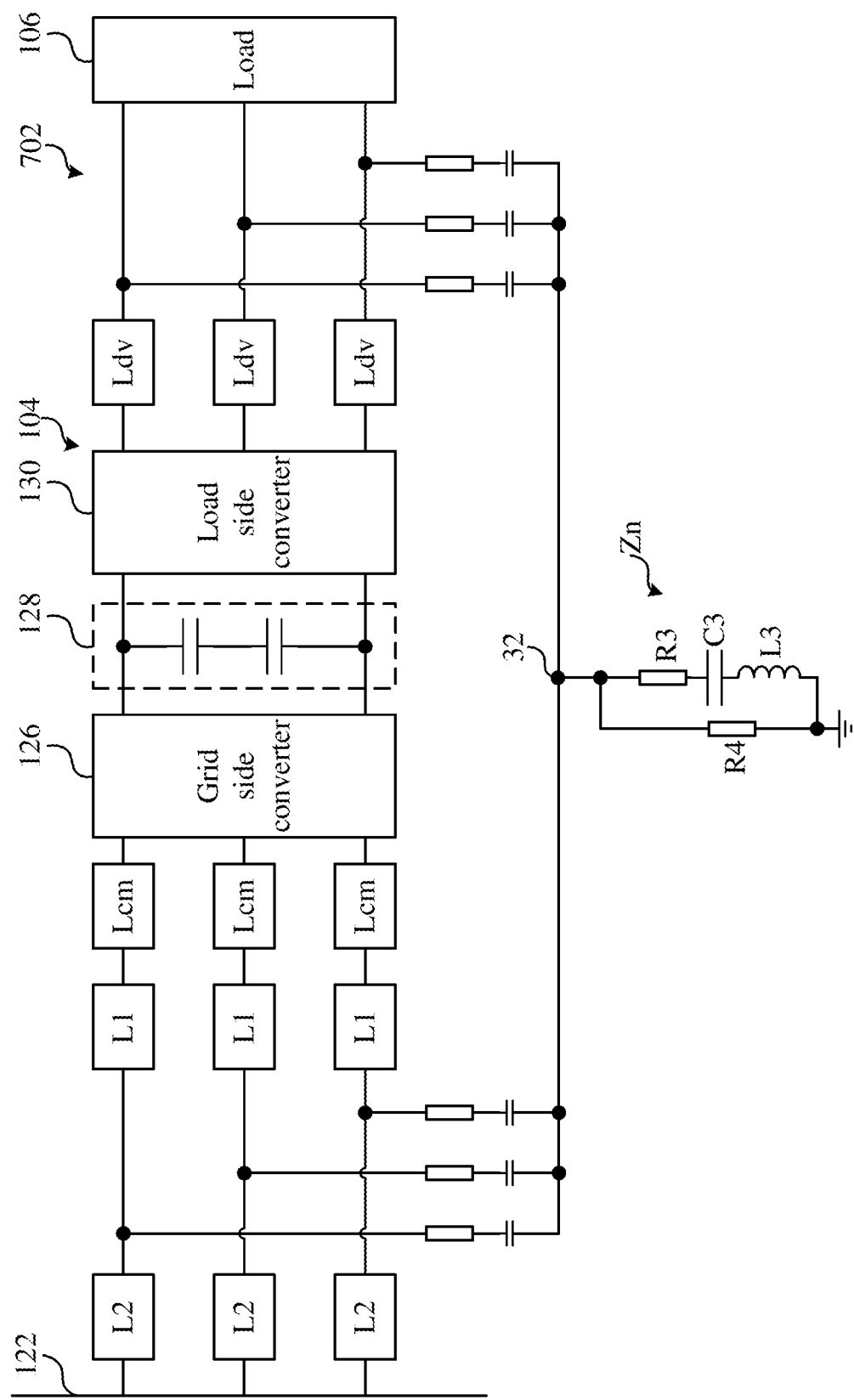
FIG. 5 is a schematic block diagram of the power conversion device in accordance with a fourth embodiment of the present invention.

FIG. 5 is a schematic block diagram of the power conversion device 702, an example of the power conversion device 102 in FIG. 1, in accordance with a fourth embodiment of the present invention. In the embodiment of FIG. 5, the impedance Zn includes a first resistance R3, a second resistance R4, a capacitance C3, and an inductance L3; the first resistance R3, the capacitance C3, and the inductance L3 are connected in series, the second resistance R4 and a series connection of the first resistance R3, the capacitance C3, and the inductance L3 are coupled in parallel between the first node 32 and the ground.

Figure 6:
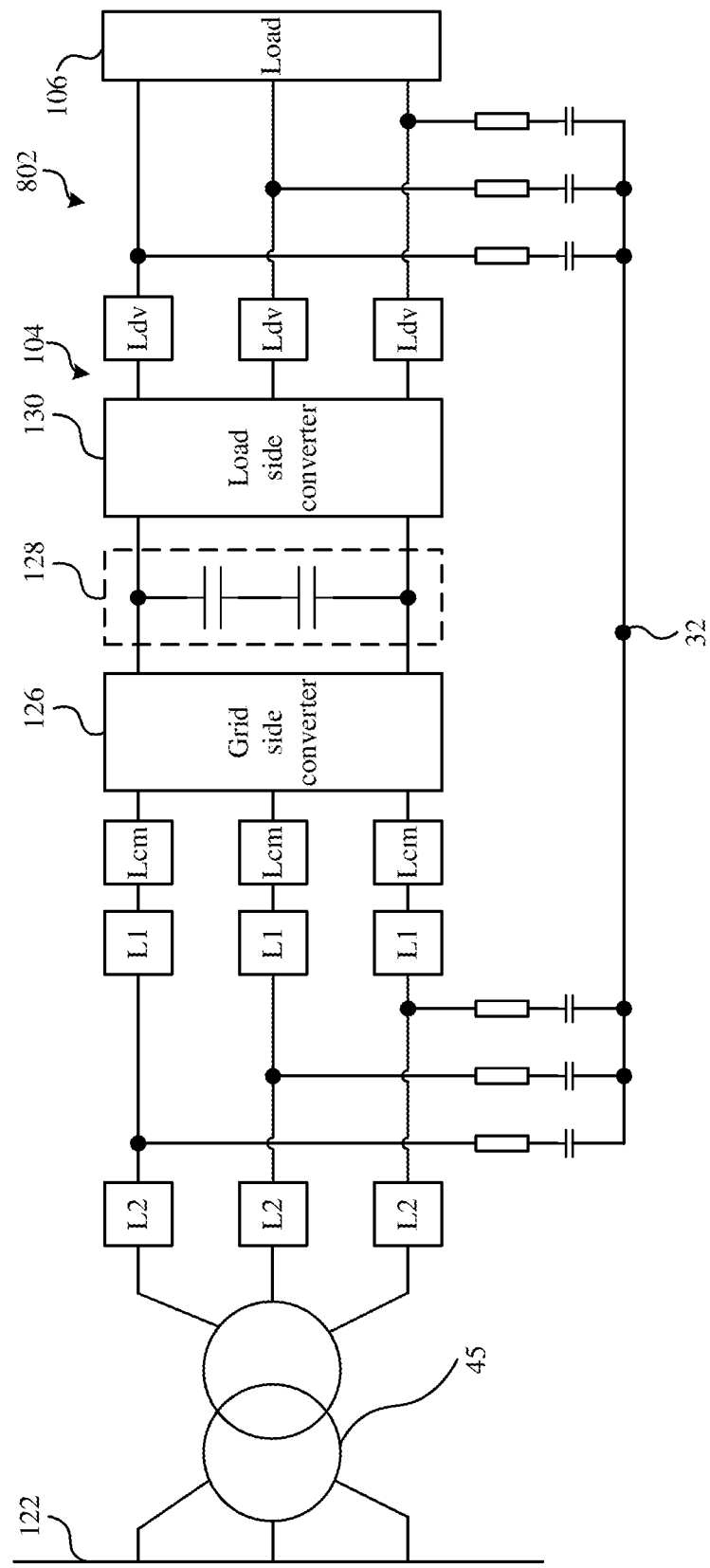
FIG. 6 is a schematic block diagram of the power conversion device in accordance with a fifth embodiment of the present invention.

FIG. 6 is a schematic block diagram of the power conversion device 802 in accordance with a fifth embodiment of the present invention. A difference between the power conversion device 802 of FIG. 6 and the power conversion device 402 of FIG. 2 is that the first node 32 is not connected to ground through the impedance Zn. In the embodiment of FIG. 6, the input of the power converter 104 is connected to the grid connection 122 through a transformer 45, the output of the power converter 104 is connected to the load 106 without transformer. In other embodiments, the first node 32 is directly grounded.

Figure 7:
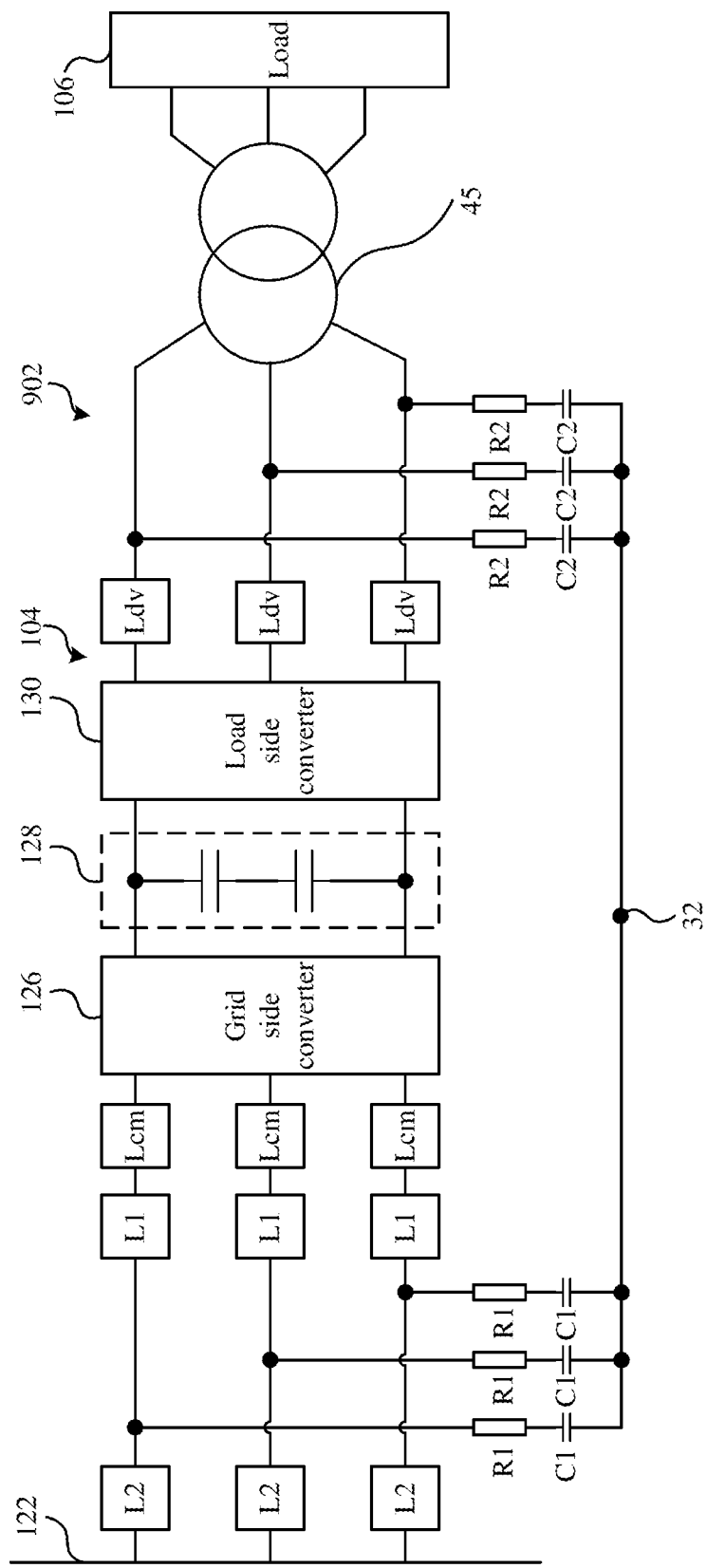
FIG. 7 is a schematic block diagram of the power conversion device in accordance with a sixth embodiment of the present invention.

FIG. 7 is a schematic block diagram of the power conversion device 902 in accordance with a sixth embodiment of the present invention. A difference between the power conversion device 902 of FIG. 7 and the power conversion device 402 of FIG. 2 is that the first node 32 is not connected to ground through the impedance Zn. In the embodiment of FIG. 7, the input of the power converter 104 is connected to the grid connection 122 without transformer, the output of the power converter 104 is connected to the load 106 through a transformer 45. In other embodiments, the first node 32 is directly grounded.

Figure 8:
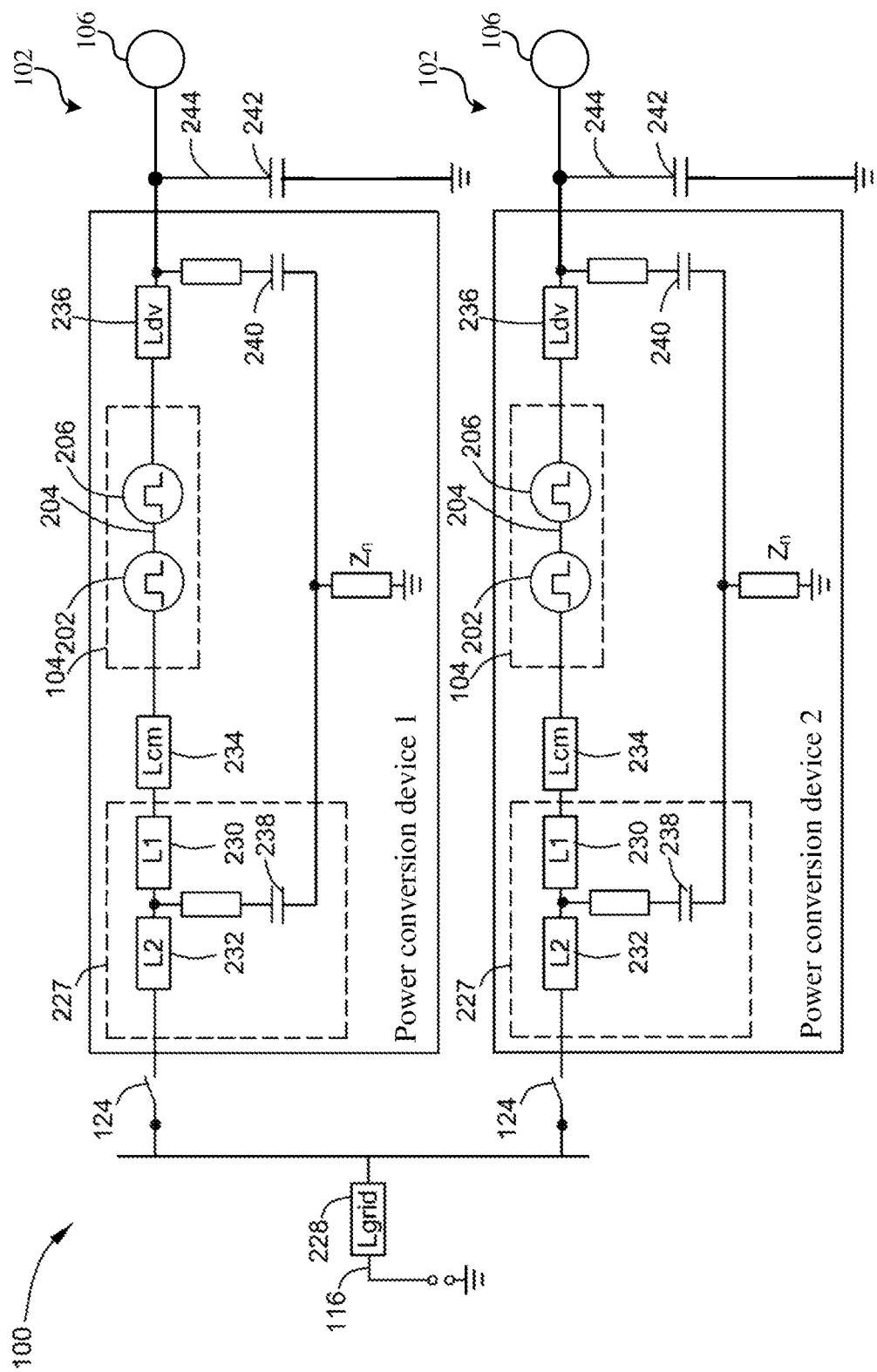
FIG. 8 is a common mode equivalent circuit diagram referring to single phase of the power conversion system shown in FIG. 1 with two power conversion devices.

FIG. 8 is a common mode equivalent circuit diagram referring to single phase of the power conversion system 100 shown in FIG. 1 with two power conversion devices 102. In the exemplary embodiment, the power converter 104 includes an AC-DC converter 202, a DC link 204, and a DC-AC inverter 206. An input of the AC-DC converter 202 is electrically coupled to the grid connection 122 and an output of the AC-DC converter 202 is electrically coupled to the DC link 204. An input of the DC-AC inverter 206 is electrically coupled to the DC link 204 and an output of the DC-AC inverter 206 is electrically coupled to a respective electrical motor 106.

The characteristic impedances include a grid inductance 228, an impedance of a sine filter 227 including a first line inductance 230, a second line inductance 232, an input capacitance 238; a common mode inductance 234; an impedance of a dv/dt filter including a drive inductance 236, an output capacitance 240; and a capacitance 242 of a load cable 244. A connection point of the input capacitance 238 and the output capacitance 240 is grounded by the impedance Zn. The connection point of the input capacitance 238 and the output capacitance 240 can be the first node 32 of FIG. 2.

In the embodiment of FIG. 8, the impedance Zn may be a high impedance. The impedance Zn is configured to limit the fault current to prevent equipment damage and arc flash hazards. Especially for explosion-sensitive environment, the maximum fault current is strictly required to limit the amount of energy dissipation under fault conditions.

The common mode inductance 234 is designed to absorb high frequency common mode (CM) voltages generated by the converters 202, 206. Its impedance dominates the voltage loop which includes the filter capacitances 238, 240. This voltage loop does not include the high impedance Zn. Therefore, the CM voltage stress on grid and motor side is generally reduced and meets relevant compliance requirements even when the power conversion system 100 is high impedance grounded. The common mode inductance 234 is an impedance of the common mode choke.

The common mode inductance 234 and the high impedance Zn are designed to fulfill all common mode requirements and provide ground fault protection.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure will not be limited to the particular embodiment disclosed as the best mode contemplated for carrying out this disclosure, but that the disclosure will include all embodiments falling within the scope of the appended claims.

The invention claimed is:

1. A power conversion system, comprising:
one or more power conversion devices electrically coupled to a grid connection, wherein each of the power conversion devices comprises:
a power converter for converting a first multiphase current provided by the grid connection into a second current;
a grid side filter coupled between the grid connection and an input of the power converter, and comprising for each phase, a first inductor, a second inductor, and a first resistor having one end in series connection with one end of a first capacitor wherein the other end of the first resistor is connected directly to an output of the first inductor and an input of the second inductor, and the other end of the first capacitor is a neutral point of the grid side filter;
a load side filter coupled to an output of the power converter wherein the load side filter, for each phase of the output of the power converter, includes a third inductor, a second resistor, a second capacitor; the third inductor is coupled between the respective phase of the output of the power converter and a respective phase of an input of the load; the second resistor having one end in series connection with one end of the second capacitor wherein the other end of the second resistor is coupled directly to an output of the third inductor and the respective phase of the input of the load, the other end of the second capacitor is a neutral point of the load side filter;
a common mode filter coupled between the grid side filter and the input of the power converter; and
the neutral points of the grid side filter and the load side filter being connected together to form a first node; wherein the first node being connected to ground via an impedance of an amount to limit fault current and the input of the power converter being connected to the grid connection without a transformer and the output of the power converter being connected to a load through a transformer.

2. The power conversion system of claim 1, wherein the impedance comprises an inductance, a capacitance, a resistance, or a combination thereof.

3. The power conversion system of claim 1, wherein the impedance comprises a first resistance, a second resistance, and a capacitance; the first resistance and the capacitance are connected in series, the second resistance and a series connection of the first resistance and the capacitance are coupled in parallel between the first node and the ground.

4. The power conversion system of claim 1, wherein the impedance comprises a first resistance, a second resistance, a capacitance, and an inductance; the first resistance, the capacitance, and the inductance are connected in series, the second resistance and a series connection of the first resistance, the capacitance, and the inductance are coupled in parallel between the first node and the ground.

5. The power conversion system of claim 1, wherein the power converter comprises a grid side converter coupled to the grid side filter, a load side converter coupled to the load side filter, and a DC link coupled between the grid side converter and the load side converter; and wherein the common mode filter is coupled between the grid side converter and the grid side filter.

6. The power conversion system of claim 1, wherein the power converter comprises a voltage source converter.

7. The power conversion system of claim 1, wherein the power converter comprises a multilevel converter.

8. The power conversion system of claim 1, further comprising:

an electrical motor for receiving the second current.

9. The power conversion system of claim 1, further comprising:

an electrical generator for generating the second current.

10. A power conversion system, comprising:

a power converter electrically coupled to a grid connection, wherein the power converter is configured to convert a first multiphase current provided at the grid connection into a second current;

a grid side filter coupled between the grid connection and an input of the power converter, and comprising for each phase, a first inductor, a second inductor, and a first resistor having one end in series connection with one end of a first capacitor wherein the other end of the first resistor is connected between the first inductor and the second inductor, and the other end of the first capacitor is a neutral point of the grid side filter;

a load side filter coupled to an output of the power converter wherein the load side filter, for each phase of the output of the power converter includes a third inductor, a second resistor, a second capacitor; the third inductor is coupled between the respective phase of the output of the power converter and a respective phase of an input of the load; the second resistor having one end in series connection with one end of the second capacitor wherein the other end of the second resistor is coupled between the third inductor and the respective phase of the input of the load, the other end of the second capacitor is a neutral point of the load side filter;

a common mode filter coupled between the grid side filter and the power converter; and the neutral points of the grid side filter and the load side filter being connected together to form a first node;

wherein the first node being connected to ground via an impedance of an amount to limit fault current and the input of the power converter being connected to the grid connection without a transformer and the output of the power converter being connected to a load through a transformer.

* * * * *